Figure 1:
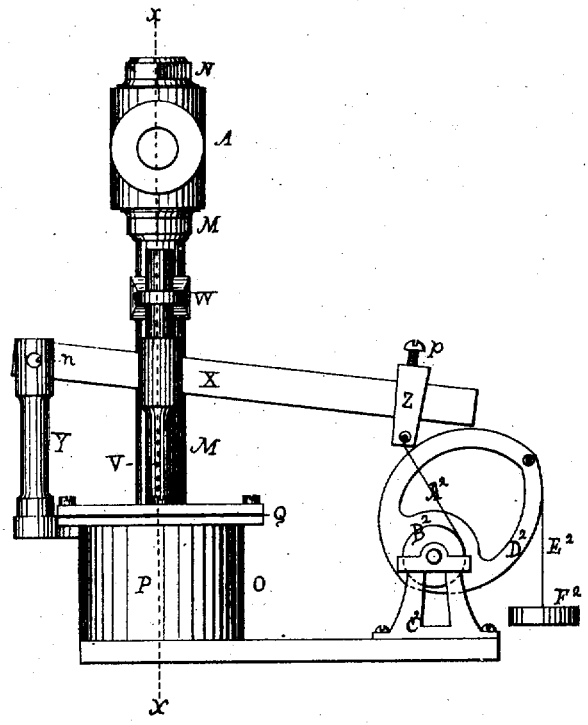

N. C. LOCKE.

Assignor of one-half to A. C. LOCKE.

Steam Pressure Regulator.

No. 9,538. Reissued Jan. 18, 1881.

WITNESSES.

Asa H. Bunker

John O'Regan

INVENTOR.

Nathaniel C. Locke.

UNITED STATES PATENT OFFICE.

NATHANIEL C. LOCKE, OF SALEM, MASSACHUSETTS, ASSIGNOR OF ONE-HALF TO ALPHEUS C. LOCKE, OF SAME PLACE.

STEAM-PRESSURE REGULATOR.

SPECIFICATION forming part of Reissued Letters Patent No. 9,538, dated January 18, 1881.

Original No. 133,460, dated November 26, 1872. Application for reissue filed September 13, 1880.

*To all whom it may concern:*

Be it known that I, NATHANIEL C. LOCKE, of Salem, in the county of Essex and State of Massachusetts, have invented certain new and useful Improvements in Steam-Pressure Regulators; and I do hereby declare that the following description, taken in connection with the accompanying drawings, hereinafter referred to, is a full and complete specification of the same.

This invention more particularly relates to that class of steam-pressure regulators (although it is applicable to others) having the valve to regulate the flow of steam to the chamber, cylinder, &c., wherein it is to be used and the diaphragm on which the steam-pressure acts so connected together that the depression or lowering of the diaphragm as the steam-pressure reduces thereon opens the valve the more to the passage of steam, and vice versa. In this class of steam-pressure regulators a weight is employed, to act in conjunction with the diaphragm of the regulator, to maintain the desired steam-pressure in the chamber, &c., wherein the steam is to be used. Heretofore this weight, while susceptible of adjustment to act with a greater or less force upon the diaphragm, was, after its adjustment, in fact, permanent in its action—that is, it acted, to all intents and purposes, always with a fixed leverage or weight upon the diaphragm, whatever might be the increase or decrease of steam-pressure, either by generation or consumption, or both, the weight or leverage being in the one case too heavy and in the other case too light to secure a perfect regulation of steam-pressure.

The main object of this invention is to overcome this disadvantage in the weight or leverage on the diaphragm to the regulator; and for such purpose it consists in a leverage or weight upon the said diaphragm so constructed and so arranged, or both so constructed and so arranged, that in the direct proportion to any increase or decrease of steam-pressure the leverage or weight on the diaphragm will decrease or increase, and thus secure the desired opening of the valve to maintain the desired steam-pressure.

In addition to the above the invention consists of a balanced puppet-valve for steam-pressure regulator, divided into two or more parts, adapted either in themselves or by additional fastening devices to be secured together and made one. By this construction of valve a seat is obtained for both of its heads, with the heads of equal diameter or area, or nearly so.

It also consists in nearly closing the passage leading from the pressure or diaphragm chamber to the steam passage or chamber, thereby holding the water contained firmly and steadily against the diaphragm, and thus preventing sudden and violent motions of diaphragm and valve.

Figure 2:
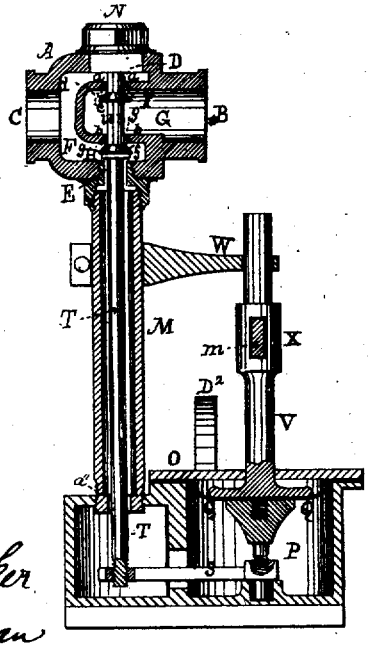
Figure 3:
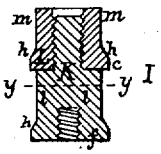
Figure 4:
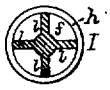

In the accompanying drawings my improvements are illustrated, Figure 1 being a side view of a steam-pressure regulator of the class to which this invention more particularly relates with my improvements applied; Fig. 2, a transverse vertical section in plane of line *x x*, Fig. 1; Fig. 3, a central vertical section of puppet-valve, and Fig. 4 a horizontal section of same in plane of line *y y*, Fig. 3.

A in the drawings represents a coupling having four openings, B, C, D, and E, two, B C, in a line at right angles to the two D and E. Within this coupling A, at one side of the passage C through it, in a line with openings D E, is a wall, F, separating the passage of coupling between openings B C, so that one side of opening C communicates with the opening D and its other and opposite side with the opening E. (See Fig. 2 of drawings.) Within the coupling-chamber G, between openings D E, are parallel shoulders, *a* and *b*—one, *a*, at one end of the wall F and the other, *b*, at the other end thereof, and the two forming continuations of said wall across the chamber G. These shoulders each have a similar-sized circular opening, H, through them, which openings H are in the same axial line as the openings D E to coupling A. The shoulders *a* and *b* are the seats for a balanced puppet-valve, I, which, as shown in Fig. 2, is placed within coupling-chamber G, to play in a line from seat *a* to seat *b*, and to come, by one of its heads, *c*, against the face *d* of seat *a*, and by the other, *f*, against the corresponding face *g* of seat *b*. The heads *c* and *f* are of an equal diameter, which diameter, however, is larger than the diameter of seat-openings H. They are each beveled off, as shown at *h*, to secure a more perfect and steam-tight joint between them and their seats; and, furthermore, the distance between them corresponds to that between their seats, so that both will at the same time be similarly and equally opened and closed. Between the heads *c* and *f* the puppet-valve is made with longitudinal radial steam-guiding wings *l*—four in number in the present instance—and under this invention it is made in two transverse parts, K and L, with one of its heads *c f* to each part. The parts K and L are adapted—the one, K, as a screw-bolt and the other, L, as a screw-nut—to be attached to and detached from each other, the nut part L having arms *m* corresponding to wings of part K. This construction of the puppet-valve I is for the purpose of securing the location of a puppet-valve having heads of equal diameter or area, or nearly so, with a seat for both heads. This hitherto has not been accomplished, owing to the trouble in locating the valve, for the reason that with the heads of equal diameter and made permanent and undetachable the one from the other, as is obvious, it is impossible to pass the valve, either by one end or the other, through either one of its seat-openings, as must be done to properly locate the valve within its chamber. Making the valve, however, as described, enables the one part to be inserted irrespective of the other, and when within their chamber in their proper relative position to the seats to be screwed or connected together. In this connection it may be well to remark that, with a long puppet-valve to properly locate it, it is best that its two parts should be unequal in size, as one part must be passed to its chamber within the coupling A through the opening B in communication therewith, and not blocked by the wall F.

The coupling A, constructed and provided with a puppet-valve, as above described, forms the medium of communication between the steam-boiler and the chamber or cylinder, &c., in which steam is to be used, and wherein it is desired to maintain a steam-pressure below the pressure in the steam-boiler, and therefore for such purpose it is located in a position such as shown in the drawings, and by a pipe at opening B connected to steam-generator, by a pipe at opening C to chamber, &c., in which the steam is to be used, and by a vertical pipe, M, at opening E to a steam-pressure regulator of suitable construction, the opening D being closed by a screw stopper or cap, N. The steam, in passing from the boiler, passes through the chamber G, provided the valve I is opened both to the chamber, &c., in which it is to be used and to the steam-pressure regulator.

O is the steam-pressure regulator with which the parts hereinabove and to be described are arranged.

P is the pressure-chamber of regulator O, with which the pipe M from coupling A communicates. This chamber P is steam-tight, and at one end has a flexible diaphragm, Q, that is secured in any suitable manner about its edges from displacement, and under this invention, by and through a fixed central vertical stem, R, with a right-angular arm, S, both within the regulator-chamber P, it is connected to the lower end of a vertical stem, T, to the puppet-valve. This valve-stem T passes through the steam-pipe M to regulator, and through said stem T all depressions or elevations of the diaphragms are communicated direct to the valve I, proportionately lowering or raising the same. As stem T to valve I is arranged within the steam-passage to regulator, no stuffing-boxes are necessary, and yet a steam-tight movement is secured.

By the arrangement and construction of pressure or diaphragm chamber P and pipe M the said chamber and lower half of pipe M, in the operation of the regulator, are necessarily filled with water of condensation, so that the steam acts on diaphragm Q through a column or body of water, thus preventing deterioration of the diaphragm, as is obvious.

To prevent sudden violent movements of valve I and diaphragm Q, to which all steam-pressure regulators are subject whose parts move freely with little friction, I hold the water in chamber P steadily and firmly against diaphragm Q by placing an obstructing-diaphragm, *a''*, in the lower part of pipe M, through which stem T passes, and which so nearly closes the passage that diaphragm Q and valve I must move very slowly, as the water can only pass slowly in and out of chamber P. The passage leading from chamber P to the steam passage or chamber may be obstructed for holding the water steady against diaphragm Q in any convenient manner, provided it be sufficiently contracted and the contracted portion of the passage be always covered with water, as if placed in steam it would be inoperative on account of the elasticity of the latter. I therefore place obstruction *a''* in the lower part of pipe M, which is always sure to contain water, while the upper part of said pipe will be filled with steam, the water being evaporated by the heat. The plan of obstruction herein described, in which the water-passage through obstruction *a''* is around stem T, is preferred, as it will be kept clear by the motion of stem T, while a fixed aperture might become clogged by sediment.

The stem R of diaphragm is guided within a socket, U, of the bottom of chamber P. Outside of chamber P its diaphragm Q has a central vertical stem, V, passing upward through a stationary guide, W. Through this stem V the diaphragm is loaded to maintain the pressure desired in the cylinder, &c., wherein the steam is to be used, and under this invention this weighting of the diaphragm is accomplished as follows:

X is a lever passing through the vertical slot *m* of diaphragm-stem V, and by one end hung to turn on a fulcrum, *n*, of fixed post Y, the other end being free to be weighted to give to said lever an increased or decreased force on the diaphragm.

Z is a clasp adapted to be slid on lever X, and to be fastened by set-screw *p*. This clasp Z has a flexible band, $A^2$, fastened by one end to it and by the other to the periphery of a drum or shaft, $B^2$, hung in suitable bearings of standards $C^2$. The band $A^2$, by turning the shaft $B^2$, is rolled up thereon or unrolled therefrom, as the case may be.

$D^2$ is a cam or eccentric wheel fixed to shaft $B^2$, hereinbefore referred to. From the periphery of this cam-wheel $D^2$, through a flexible strap, line, or chain, $E^2$, is suspended a weight, $F^2$, or, as in weighing-scales, it may be a holder or rest on which a weight or weights may be placed, as desired. Turning the shaft $B^2$ the eccentric is turned, and according to the direction of the turning of the shaft the flexible strap $E^2$ is laid upon or allowed to swing off from the periphery of eccentric. The location of the strap on eccentric is such that pulling down on the strap will pull down the lever X, resting, as described, on the diaphragm, thus increasing the weight or leverage thereon, and that pulling the strap in the opposite direction the weight or leverage on diaphragm is lessened.

An arrangement of parts such as above described between lever X and weight $F^2$—first having properly adjusted them to the pressure desired to be maintained by applying a lighter or heavier weight, $F^2$, or a series of weights, or by changing the position of slide Z on lever X, increasing or decreasing its length of leverage on diaphragm, or both—operates as follows: Whether by a decreased generation of steam in the boiler or by an increased consumption of steam in the cylinder, &c., wherein it is to be used, or both, the steam-pressure within the cylinder, &c., is reduced, the steam-pressure on diaphragm Q to regulator is proportionately reduced, leaving it free to be depressed by the weight or leverage which is upon it, and the arrangement of this weight or leverage, as herein described, is such that as the diaphragm lowers or falls it increases in weight or leverage, (the eccentric then turning in a direction to lengthen the arm of leverage or weight on the shaft $B^2$, and through it on lever X,) and thus it assists and hastens the depression or fall of the diaphragm, and consequently the opening of the valve I to the flow of steam through it, establishing the desired steam-pressure in cylinder, &c.; and whether by an increased generation of steam in the boiler or by a decreased consumption of steam in the cylinder, &c., wherein it is used, or both, the steam-pressure within the cylinder, &c., is increased, the steam-pressure on diaphragm to regulator is proportionately increased, raising or lifting it, as also the lever X, and through it turning the shaft $B^2$ in a direction to decrease the arm of leverage of weight on said shaft, and consequently, by thus decreasing its force or leverage against the diaphragm, assist and hasten its lifting movement, and through it the closing of passage through valve for steam, whereby the flow of steam is proportionately reduced to bring the steam-pressure in cylinder, &c., to the required or desired amount. The form of the eccentric or cam $D^2$ is such as at all points of leverage through it upon the shaft $B^2$, and thus upon the diaphragm Q, to cause a smooth, even, and regular change.

In lieu of suspending the weight $F^2$ to a cam-periphery, as described, it may be hung directly to an arm from the shaft, the same leverage effect being then produced, but not in so smooth and even manner.

In lieu of an adjustable clasp, Z, on lever X, it may be a fixed one; but to have it adjustable is desirable, as it enables a nicer adjustment of leverage to be made.

In lieu of a flexible suspension for weight from cam $D^2$, and also connection between lever X and shaft $B^2$, a rigid one in either one or both cases may be used; but it is best to have them both flexible, their operation and effect being more perfect, steady, reliable, and easy.

In lieu of making the puppet-valve in two transverse parts, as described in detail herein, it may be made in more than two parts; and in lieu of adapting them to be screwed the one to the other, as described, they may be constructed for being fastened together by independent fastening devices.

The arrangement of leverage herein described, or any equivalent therefor, in addition to being applied to the peculiar constructed and arranged steam-pressure regulator herein described, may be applied to other forms of regulators; and therefore it is not intended to limit it to any particular style or construction of steam-pressure regulator, it being intended to apply it to any steam-pressure regulator to which it is now adapted or may be hereafter found adapted.

Having thus described my improvements in steam-pressure regulators, I will state my claims as follows:

1. The combination, in a steam-pressure regulator, of a valve, I, chamber P, diaphragm Q, and lever X, with a weight so applied that a movement of the diaphragm produces a proportionate change of load upon the diaphragm.

2. The combination, in a steam-pressure regulator having valve I, chamber P, and diaphragm Q, of shaft $B^2$, cam $D^2$, lever X, pliable band $A^2$, and weight $F^2$, all arranged substantially as and for the purpose specified.

3. In a steam-pressure regulator, the chamber P, having a passage through which the pressure is communicated to said chamber, said passage being so contracted below the water-line as to prevent sudden vibratory motions of diaphragm and valve.

4. The combination, in a steam-pressure regulator having chamber P, valve I, and pipe M, of obstructing-diaphragm $a''$, located below the water-line in said pipe M, and adapted to limit the flow of water so as to prevent sudden vibratory motions of diaphragm and valve, substantially as shown and described, and for the purpose specified.

The above specification of my improvements in steam-pressure regulators signed by me this 7th day of September, A. D. 1880.

NATHANIEL C. LOCKE.

Witnesses:

JOHN O'REGAN,

CHAS. A. ESTES.